United States Patent

[11] 3,573,369

[72] Inventors Gerhard Konig; Helmut Schmidt; Klaus Singer, Villingen, Germany
[21] Appl. No. 714,127
[22] Filed Mar. 18, 1968
[45] Patented Apr. 6, 1971
[73] Assignee Kienzle Apparate G.m.b.H. Villingen, Black Forest, Germany
[32] Priority Mar. 18, 1967
[33] Germany
[31] K61767

[54] KEY-CONTROLLED INDUCTIVE INPUT ARRANGEMENT
16 Claims, 11 Drawing Figs.

[52] U.S. Cl. .......... 178/17, 179/90, 340/365, 197/98, 235/145
[51] Int. Cl. .......... H04l 15/12
[50] Field of Search .......... 179/90 (K), 90 (CI); 178/17 (A), 17 (C); 235/145, 146; 340/365; 197/98, 19; 340/347

[56] References Cited
UNITED STATES PATENTS 2,997,703 8/1961 Powell .......... 340/347
2,861,262 11/1958 Pankove .......... 340/365

*Primary Examiner*—Kathleen H. Claffy
*Assistant Examiner*—Tom D'Amico
*Attorney*—Michael S. Striker

ABSTRACT: A primary circuit of a printed circuit plate is inductively coupled with a secondary circuit of a printed circuit plate when a key-controlled core pin connects a coupling loop of the primary circuit with a coupling loop of the secondary circuit. The coupling loops of the secondary circuit are arranged in accordance with a binary code so that pulses at the output terminals of the secondary circuit represent in coded form the information introduced into the primary circuit by operation of selected keys associated with alpha numerical information.

INVENTORS
Gerhard KÖNIG
Helmut SCHMIDT
Klaus SINGER

INVENTORS
Gerhard KÖNIG
Helmut SCHMIDT
Klaus SINGER

FIG. 2a

| Key No. | N1 | 2 | 3 | 4 | 5 | 6 | 7 | 8 | 9 | 10 | 11 | 12 | 13 | 14 | 15 | B1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|---|---|---|---|---|---|---|---|---|---|
| Symbols | C | 0 | 00 | 4 | 7 | 1 | 0 | 5 | 8 | 2 | 000 | 6 | 9 | 3 | ) | Function Commands | | | | | | | | | | | | | | | |
| sn1 | L | 0 | 0 | 0 | L | L | 0 | L | 0 | 0 | L | 0 | L | L | 0 | 0 | 0 | 0 | | 0 | L | 0 | | 0 | 0 | L | 0 | 0 | L | 0 | L |
| sn2 | 0 | 0 | L | 0 | L | 0 | 0 | 0 | 0 | L | L | L | 0 | L | 0 | 0 | 0 | 0 | | L | L | 0 | | 0 | L | 0 | 0 | L | 0 | L | 0 |
| sn3 | L | 0 | L | L | L | 0 | 0 | L | 0 | 0 | L | L | 0 | 0 | L | 0 | 0 | L | | L | 0 | 0 | | L | 0 | L | L | 0 | 0 | 0 | 0 |
| sn4 | L | 0 | L | 0 | 0 | 0 | 0 | 0 | L | 0 | L | 0 | L | 0 | L | 0 | L | L | | 0 | 0 | L | | 0 | L | 0 | 0 | 0 | L | 0 | 0 |
| sn5 | L | L | L | L | L | L | L | L | L | L | L | L | L | L | 0 | L | L | 0 | | 0 | 0 | 0 | | L | 0 | 0 | 0 | L | 0 | 0 | L |
| sn6 | 0 | 0 | 0 | 0 | 0 | 0 | 0 | 0 | 0 | 0 | 0 | 0 | 0 | 0 | 0 | L | L | L | | L | L | L | | L | L | L | L | L | L | L | L |
| sn7 | 0 | L | 0 | 0 | 0 | 0 | L | L | 0 | 0 | L | L | L | L | 0 | L | 0 | 0 | | 0 | 0 | L | | 0 | 0 | 0 | L | 0 | 0 | L | 0 |

INVENTORS
Gerhard KÖNIG
Helmut SCHMIDT
Klaus SINGER

INVENTORS
Gerhard KÖNIG
Helmut SCHMIDT
Klaus SINGER

INVENTORS
Gerhard KÖNIG
Helmut SCHMIDT
Klaus SINGER

INVENTOR
Gerhard KÖNIG
Helmut SCHMIDT
Klaus SINGER

PATENTED APR 6 1971 3,573,369

INVENTORS
Gerhard KÖNIG
Helmut SCHMIDT
Klaus SINGER

KEY-CONTROLLED INDUCTIVE INPUT ARRANGEMENT

BACKGROUND OF THE INVENTION

The operational speed of modern data processing machines is very high, but the actual output depends on the speed at which the information to be processed is entered into the machine.

Since data processing machines can handle only coded information, the input of the machine must include a coding device, and the output must include a decoding device. Unless the input of the data processing machine is controlled by record carriers, such as punched tape, punch cards, or magnetic record carriers, the input of the machine usually includes a keyboard and a coding device. When a key associated with a particular character or digit is actuated, a corresponding code sequence consisting of several bits is stored or directly supplied to the data processing machine.

Mechanical contacts operated by keys are unsuitable for this purpose, and it is known to transform the movement of the manually operated key into an inductive capacitive change of an electrical condition. The inductive coupling has been found preferable, and in a known apparatus of this type, each key is associated with an open magnetic core, and the key stem has a yoke which completes the magnet core to form a closed ring when the respective key is actuated. A primary conductor and a set of secondary conductors passes through the magnetic core, and only when the key is actuated and the core closed, a driving impulse produced in the primary conductor induces a secondary pulse in the secondary conductors. Wires are used as primary and secondary conductors, and in order to obtain a sufficient magnetic inductive flux, the primary conductor has several windings at each magnetic core. The primary conductor is common for all magnetic cores, but the secondary conductors are guided only through selected magnetic cores, the selection being carried out in accordance with a code, so that only in secondary conductors determined by the code, a secondary pulse is induced and supplied to the output terminals.

This known inductive input apparatus operates very reliably, since the closed magnetic field of the permanent magnetic cores, a very strong inductive coupling effect is produced. However, the arrangement has the disadvantage that the number of permanent magnetic cores must correspond to the number of keys, and another disadvantage is that the threading of the conductor wires through the cores requires great manual dexterity and time-consuming assembly operations. There is also the danger that during operation the yokes of the key stems magnetically adhere to the magnetic cores and reduce the input speed. Since the return of an actuated key to its initial position is accomplished by a spring, it is necessary to use strong springs for overcoming the magnetic adhesion so that a comparatively great force is required for depression of the key. A great resistance of the keys against operation reduces the input speed and causes fatigue of the operator who manually actuates the keys.

SUMMARY OF THE INVENTION

It is one object of the invention to provide a manually controlled inductive input arrangement which is inexpensively manufactured and permits at least the same writing speed as a modern electric typewriter.

Another object of the invention is to maintain the force required for operating the keys of an inductive input arrangement at the level customary for typewriters.

Another object of the invention is to provide a key-controlled reliably operating inductive input arrangement of compact construction.

A further object of the invention is to provide a key-controlled input arrangement for a data processing machine which is capable of entering all symbols and characters occurring on a standard typewriter keyboard by the same number of keys as in the typewriter, so that some of the keys have to represent more than one symbol or character although only lower case alphabetical characters or only upper case alphabetical characters are provided on the keyboards.

By using the same key for more than one symbol, the number of keys is lower than the number of symbols representing alphanumerical information which can be entered while the arrangement of the symbols and characters on the keyboard corresponds to the keyboard of a standard typewriter so that an operator familiar with a typewriter can easily operate the keys of the input arrangement of the invention.

It is also an object of the invention to provide apparatus which cannot only be used with keys representing alphanumerical information, but also with a numerical keyboard as used in calculators and accounting machines.

With these objects in view, one embodiment of the invention comprises primary circuit means having a plurality of sets of primary coupling loops, at least one set of secondary circuit means having secondary coupling loops registering with selected primary coupling loops in accordance with a code, a plurality of sets of core respectively connected with and controlled by key means to move to and from a coupling position located in a set of primary coupling loops and in secondary coupling loops where the same are provided in accordance with the code, means for generating a driving pulse in the primary circuit and operated by the keys, and a set of output means respectively connected with the secondary circuit means for receiving secondary pulses induced in secondary circuits where a core means inductively couples a primary coupling loop with a secondary coupling loop.

In the preferred embodiment of the invention, a primary printed circuit plate and first and second secondary printed circuit plates are superimposed, and the plates have a plurality of sets of registering holes forming a set of rows of holes in each of the plates. The primary circuit means includes a set of pairs of primary conductor bars respectively extending along the rows of holes of the primary plate and forming primary coupling loops about the holes in the primary plate. The conductor bars are connected in series to form a primary line loop.

The secondary circuit means preferably include two sets of pairs of secondary conductor bars which extend along the rows of holes in the first and second secondary plates, and which form secondary coupling loops about selected holes. The ends of each pair os secondary conductor bars are connected to each other so that the conductor bars of the first secondary plate form a first set of secondary line loops, and the conductor bars of the second secondary plate form a second set of secondary line loops. The secondary line loops are respectively connected with different output means, preferably through a storage device including a flip-flop for each secondary line loop.

In the preferred embodiment of the invention, the primary and secondary conductor bars are printed circuit components secured to opposite sides of the primary and secondary plates, respectively.

Whenever a key is operated, a set of magnetizable core pins is inserted into a corresponding set of holes of the primary plate and passes through a corresponding set of primary coupling loops, and also into sets of holes in the two secondary plates so as to project into secondary coupling loops where the same are provided.

Each key also operates means by which a photocell is actuated to produce a pulse which is amplified and shaped, and supplied as a driving pulse to the primary circuit means, and more particularly to the primary line loop, passing through all primary coupling loops of the same, and inducing secondary pulses wherever secondary coupling loops are provided in accordance with a code.

The holes in the primary and secondary plates are arranged in lines and columns, each column containing a set of holes, for example four holes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2*a* is a table representing the code for transforming the information of the keys of the keyboard of FIG. 2 into coded signals;

DESCRIPTION OF THE PREFERRED EMBODIMENTS

Figure 1:
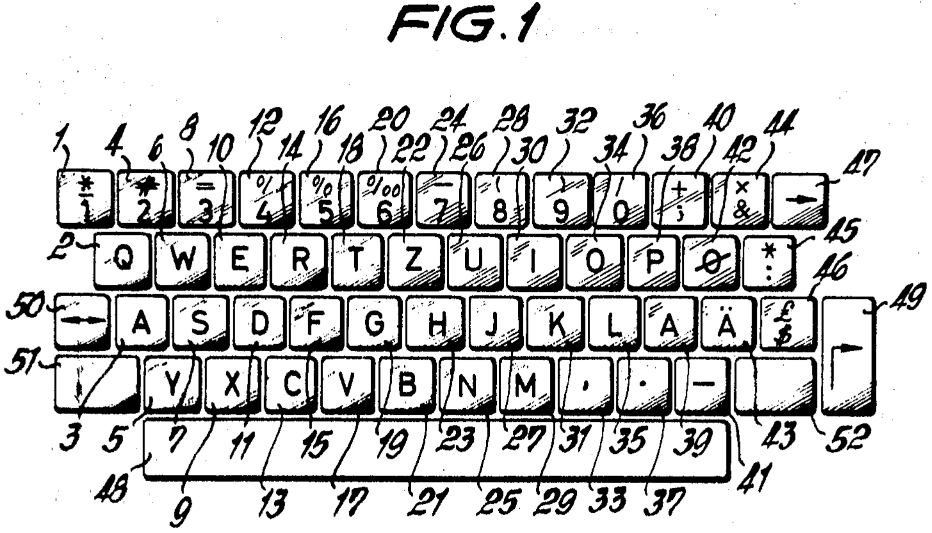
FIG. 1 is a fragmentary plan view illustrating an alphanumerical keyboard for an apparatus according to the invention.
Figure 2:
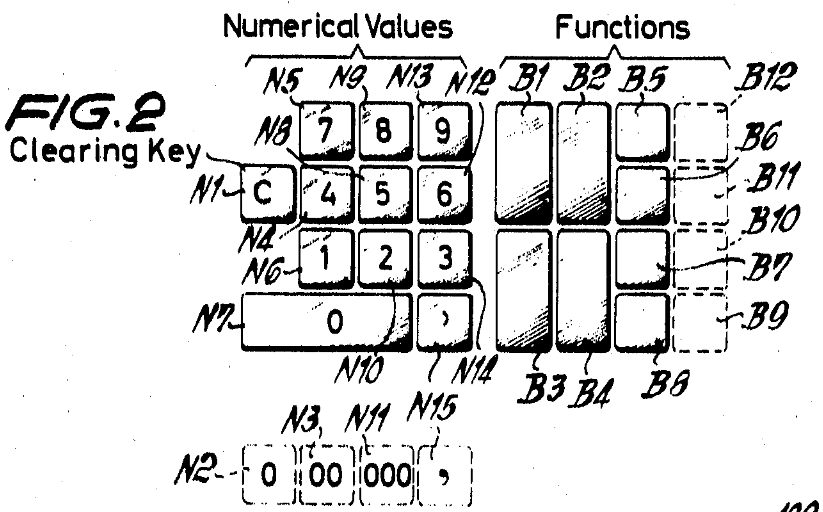
FIG. 2 is a fragmentary plan view illustrating a keyboard having numerical keys and function keys for controlling the input arrangement of the invention.
Figure 1A:
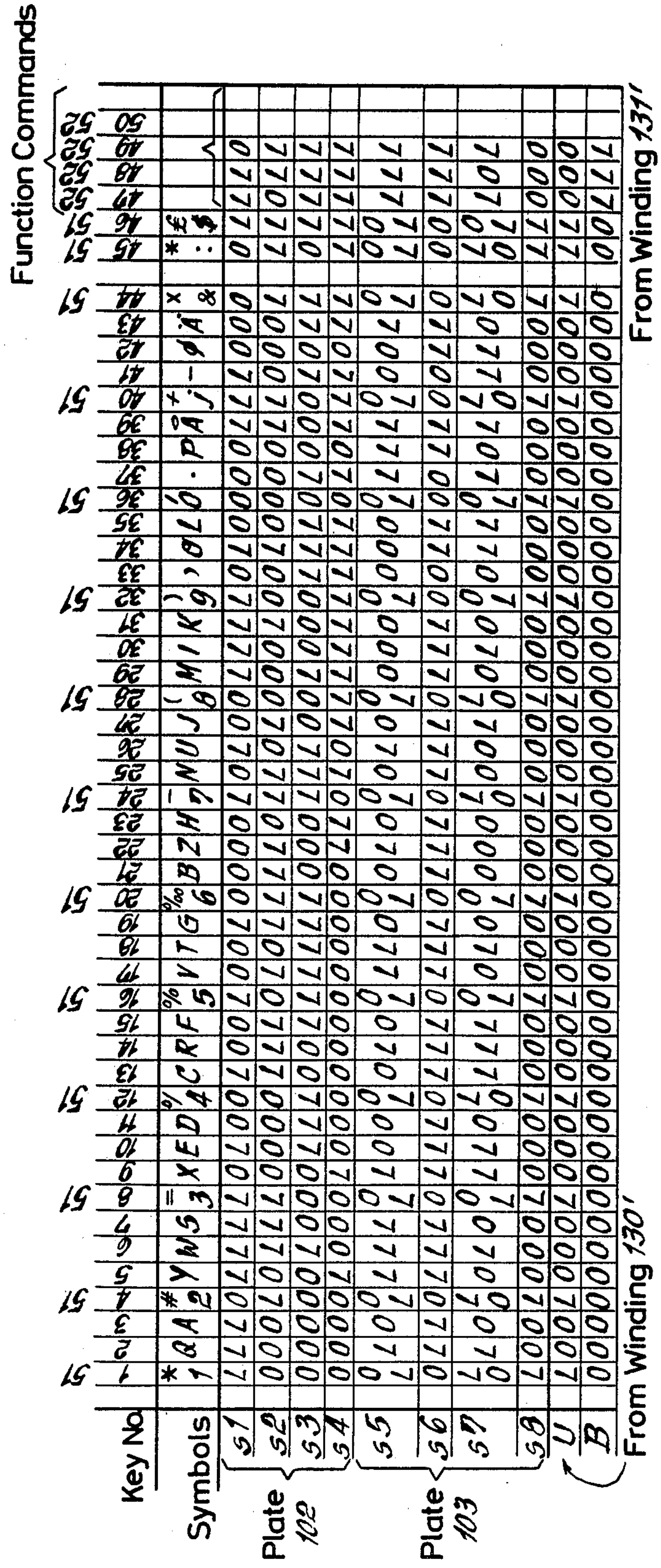
FIG. 1*a* is a table representing the code for transforming the alphanumerical information of the keys of the keyboard of FIG. 1 into coded signals.

The alphanumerical keyboard shown in FIG. 1 has keys numbered 1—52, which are also identified in the uppermost line in FIG. 1*a*. The keys of the numerical keyboard shown in FIG. 2 are numbered N1 to N15, and the function keys shown in FIG. 2 are numbered B1 to B12. The keyboard of FIG. 1 corresponds to the keyboard of a conventional billing machine, and the keyboard shown in FIG. 2 corresponds to the keyboard of an accounting machine.

Figure 3:
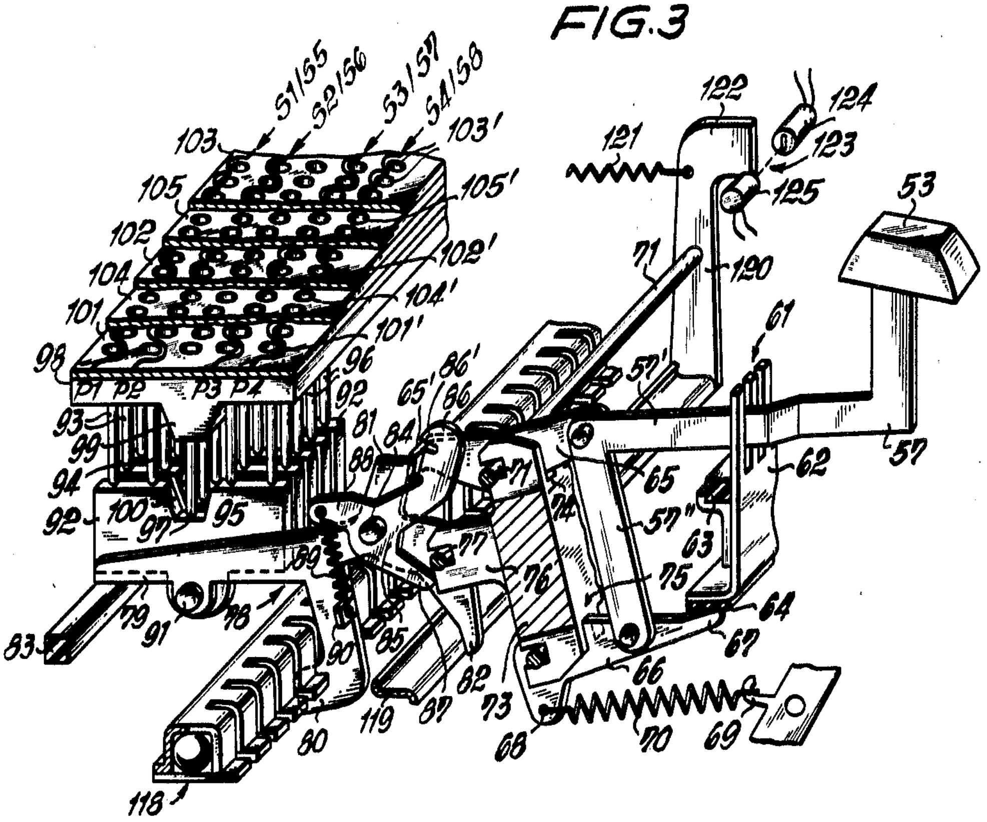
FIG. 3 is a fragmentary perspective view illustrating the key-controlled mechanism for operating the coupling core pins of the input arrangement.
Figure 4:
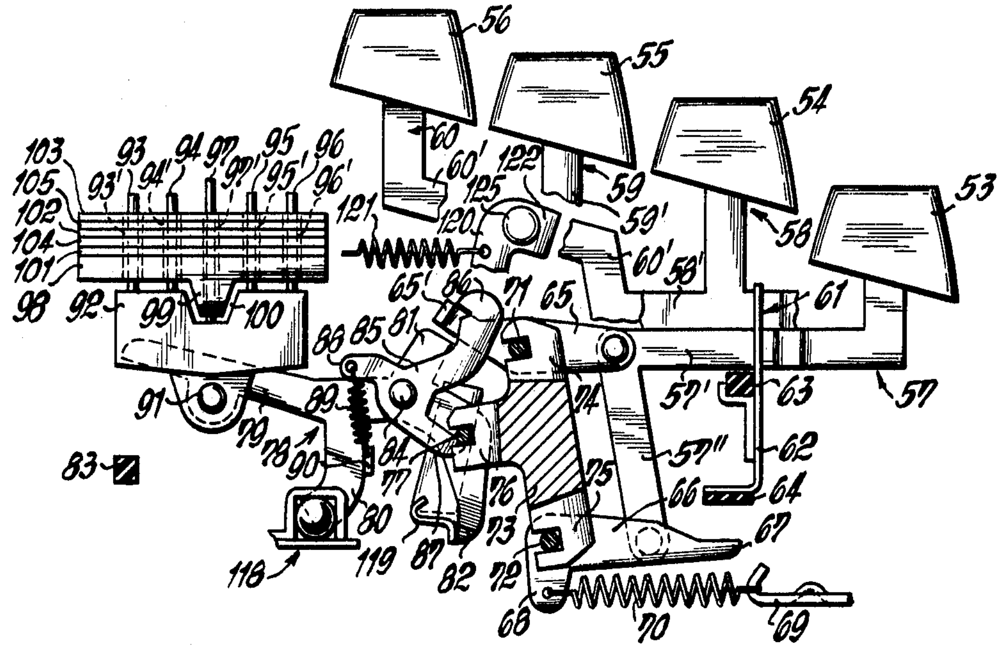
FIG. 4 is a fragmentary side elevation illustrating the mechanism of FIG. 3 in another operational position.
Figure 5:
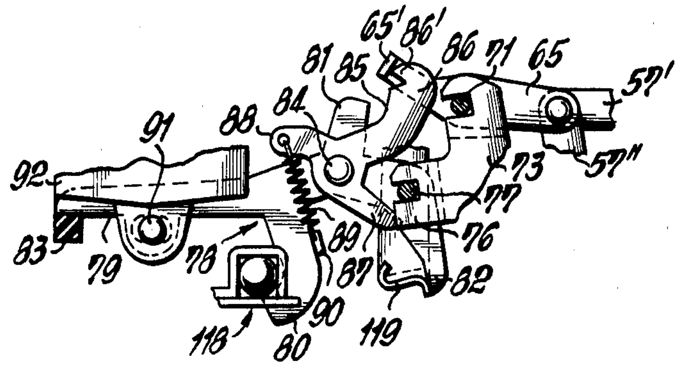
FIG. 5 is a fragmentary side elevation illustrating the mechanism of FIGS. 3 and 4 in another operational position.

As shown in FIGS. 3 and 4, the keys 53, 54, 55 and 56 are mounted on angular key levers 57, 58, 59 and 60 which respectively consist of first arms 57', 58', 59', 60' and second arms 57'', 58'', 59'' and 60''. Key lever arms 57', 58', 59' and 60' are laterally guided in a comb structure 61 for movement in vertical direction. The lower portion of the comb structure is a plate 62 carrying an elastic stop 63 for key lever arms 57' to 60', and having another elastic stop 64. Stops 63 and 64 respectively limit the downward and upward movement of the respective key lever. Arms 57'' to 60'' are pivotally connected with a connecting lever 65 and a return lever 66, the latter having a stop portion 67 cooperating with stop 64. A spring 70 connects an arm 68 of return lever 66 with a hook 69 on a stationary frame portion. The return levers 66 and the connecting levers 65 are respectively mounted on shafts 72 and 71 supported on a bar 73 which has guide slots 74 and 75 for levers 65 and 66. Bar 73, and comb structure 61 extend over the entire width of the keyboard. Bar 73 has a rearwardly projecting slotted part 76 supporting a shaft 77 on which levers 78 are turnably mounted.

Each lever 78 has a lifting arm 79, a locking arm 80, a holding arm 81, and a switching arm 82. Control lever 78 has a position of rest in which lifting arm 79 abuts a stop 83. A coupling pawl 85 is mounted on a pivot 84 carried by control lever 78, and has a hook-shaped coupling arm 86, a release arm 87, and an arm 88 to which a spring 89 is secured, whose other end is attached to a lug 90 of locking arm 80 so that coupling pawl 85 is urged to turn in counterclockwise direction as viewed in FIGS. 3 and 4. Connecting lever 65 has a coupling portion 65' projecting into the planes in which connecting lever 78 and coupling pawl 85 move and being positioned so that coupling portion is located in front of the holding arm 81, and under the hook 86' of coupling arm 86 in the position of rest of connecting lever 65.

A pin carrier 92 is pivotally connected by a pivot means 91 with the lifting arm 79 of control lever 78. Pin carrier 92 has other locking coupling pins 93, 94, 95, 96 and a guide pin 97 for each key, coupling pins 93—96 consisting of a ferromagnetic material. A ball locking means 118 of known construction is disposed in the path of movement of locking arm 80 of each control lever 78, so that it is not possible to operate two keys simultaneously. A row of balls is located in a closed channel through whose slots only one locking arm 80 can enter which drives the balls apart to abut the end plates of the channel while being pressed against each other so that no other locking arm can enter between two other balls.

A rail 119 is located in the path of movement of switching arms 82. The ends of rail 119 are carried by lever arms 120 of which only one is shown in the drawing, the lever arms 120 being supported on shaft 79 for angular movement and being biassed by springs 121 so that rail 119 abuts switching arms 82. The illustrated spring 121 is secured to an extension of lever arm 120 having a shutter portion 122 which interrupts the path of light rays between a source of light 124 and a photocell 125 forming a light barrier 123.

A base plate 98 preferably consisting of a nonconductive material, such as a synthetic material, is disposed above the row of pin carriers 92 which are held together by a metal frame, not shown. Base plate 98 has holes 93', 94', 95', 96' and 97', see FIG. 4, into which coupling pins 93, 94, 95 and guide pin 97 of each pin carrier 92 enter when the respective pin carrier is lifted. In order to provide sufficient guidance of guide pin 97 in a sufficiently long hole 97' without increasing the thickness of the guiding base plate 98, the same is provided with a central ridge 99, while the pin carriers 92 have corresponding matching cutouts 100. Base plate 98 extends over the entire width of the keyboard, but under consideration of the different coefficients of thermal expansion of the metal frame, not shown, in which base plate 98 is mounted, of bar 73 which also consists of metal, and of base plate 98 which consists of a synthetic plastic material, baseplate 98 is not an integral member, but consists of several pieces, each of which is secured at the center thereof to the metal frame, not shown. A primary plate 101 and two secondary plates 102 and 103 are superimposed on the base plate 98 and are separated from each other by insulating plates 104 and 105, which are shown broken off in FIG. 3. All plates 101—105, and the baseplate 98, have holes 101'—105', arranged in lines and columns and registering with coupling pins 93, 94, 95 and 96. A central line of holes is provided in plates 101—105 for receiving the guide pins 97, and these guide holes have not been numbered since they perform only a guiding function.

The primary plate 101 has holes arranged in four lines P1, P2, P3, P4. The secondary plate 102 has holes arranged in four lines S1, S2, S3, S4, and the second secondary plate 103 has holes arranged in lines S5, S6, S7, and S8.

Figure 7:
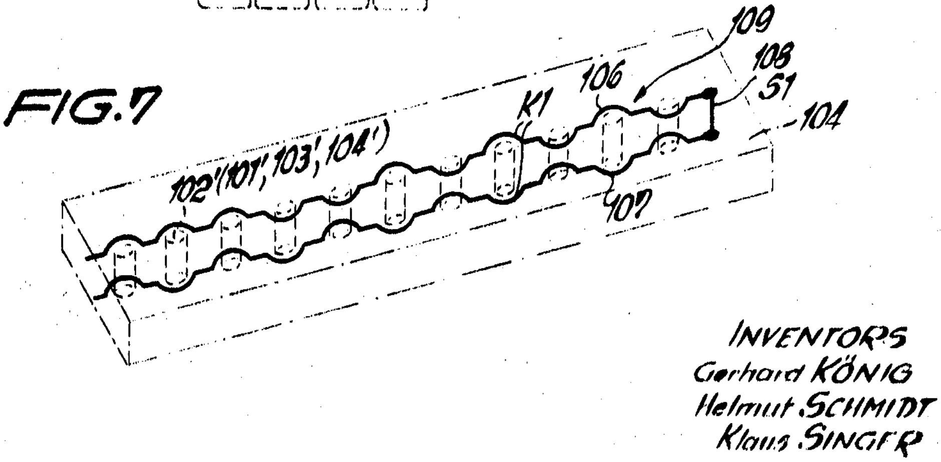
FIG. 7 is a fragmentary schematic perspective view illustrating secondary conductor bars attached to opposite sides of a secondary plate as printed circuit components and being connected to each other to form a secondary line loop.
Figure 8:
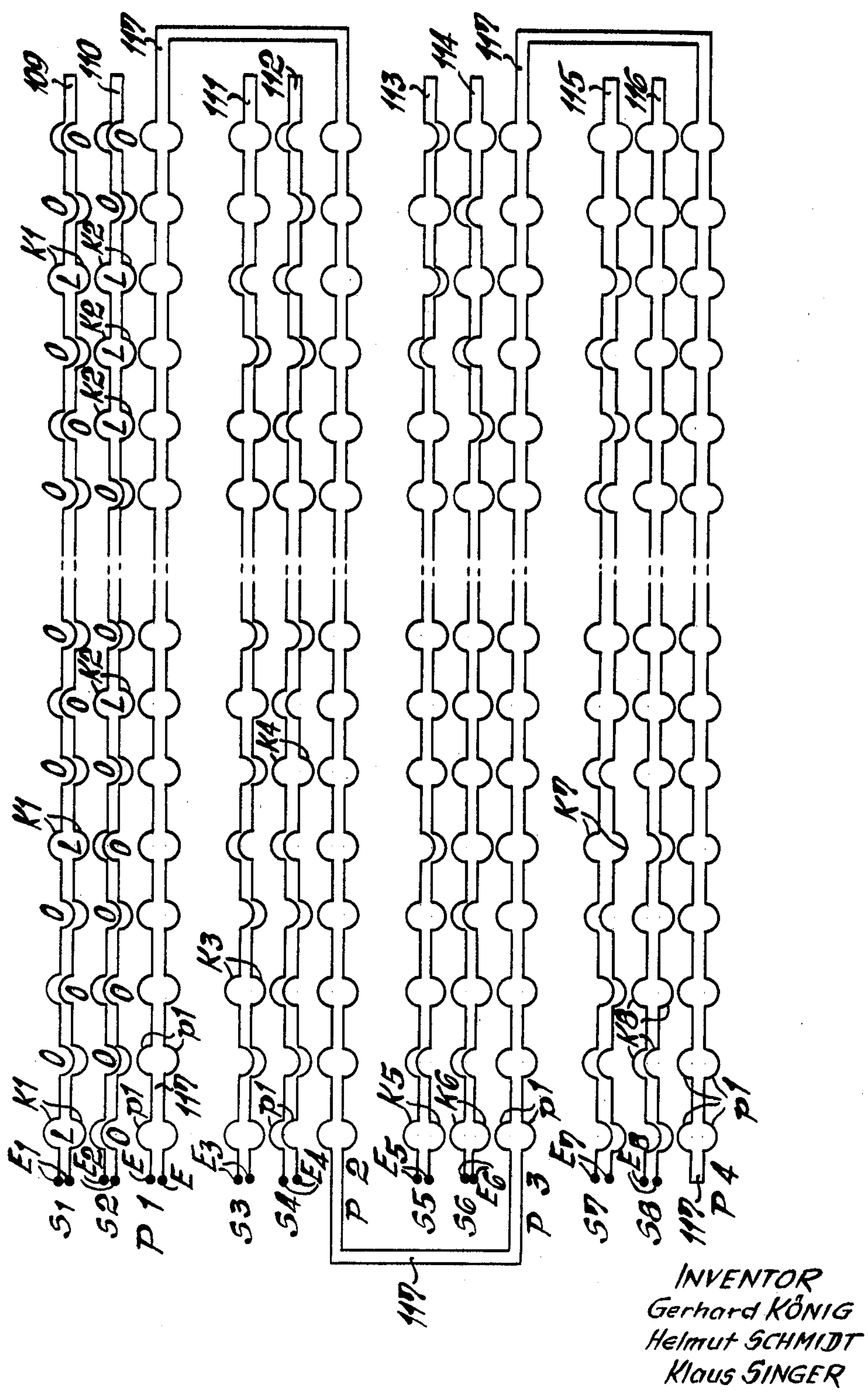
FIG. 8 is a schematic diagram illustrating the association between the primary line loop and the secondary line loops, and the arrangement of the secondary coupling loops in accordance with a code.

Each line or row of holes P1—P4 of the primary plate 101, and the lines of holes S1—S8 of the secondary plates 102 and 103 are provided with conductor bars 106, 107. As best seen in FIG. 7, conductor bars 106 are secured to the top faces of plates 101, 102, 103, and conductor bars 107 are secured to the bottom faces of the same. Conductor bars 106, 107 have semicircular portions embracing one side of holes 101'—104', and a connector 108 connects the ends of each pair of conductor bars 106, 107 so that line loops 109—116 are formed as shown in FIG. 8, each pair of conductor bars 106 and 107 and connector 108 forming an elongated conductive loop extending along a line of holes. While the lines of holes S1—S8 of the secondary plates 102 and 103 have separate unconnected line loops 109—116, the connector bars 106 and 107 of each line of holes P1, P2, P3 and P4 in the primary plate 101 are connected to each other to form one loop 117 in which the respective conductor bars are connected in series.

As best seen in FIG. 7, the semicircular portions of the conductor bars 106 and 107 are arranged exactly symmetrical to the line of symmetry of the respective line of holes. The semicircular conductor portions of the upper conductor bar 106 are partly positioned relative to the semicircular conductor portions of the lower conductor bar 107 so that the two semicircular conductor portions associated with one hole together form an almost completely circular coupling loop, as shown at *K*1 in FIG. 7. Corresponding closed substantially circular coupling loops *K*1—*K*9 are shown in FIG. 8.

In the region of other holes, the semicircular conductor portion of a conductor bar 106 is parallel with the respective semicircular conductor portion of conductor bar 107 correlated with the same hole, so that no coupling loop is formed since both arcuate coupling portions are located on the same side of the respective hole.

The upper and lower conductor bars 106 and 107 of the primary plate 101 are constructed so that complete coupling loops p1 are formed about each hole of primary plate 101 in all four rows or lines of holes P1—P4, as clearly shown in FIG. 8.

The conductor bars 106 and 107 of the secondary plates 102 and 103 have for some holes complete coupling loops, for example *k*1, *K*3, and for other holes parallel and superimposed semicircular portions located at the same side of the respective hole, and consequently not forming a complete coupling loop. For example, in the line of holes S1, the first hole is surrounded by a complete coupling loop *K*1, while the second, third and fourth holes are not, as is apparent from FIG. 8.

Each line loop 109—116 of the secondary plates 102, 103, and the respective lines of holes S1—S8, have several holes provided with coupling loops *K*1—*K*8, and other holes without coupling loops. Holes having coupling loops *K*1—*K*8 are designated as L-positions, and holes having no coupling loops are designated as O-positions. No corresponding designation is provided for the lines of holes P1, P2, P3, P4 of the primary plate 101, since each hole of these four lines has a complete coupling loop p1.

The L-positions and the 0-positions of the eight lines or rows S1—S8 are arranged in accordance with a code shown in lines *s*1—*s*8 of FIG. 1*a*.

It will be noted that lines *s*5 and *s*7 of FIG. 1*a* have certain columns, associated with keys, in which a L and a 0 appear, which will be explained hereinafter. For the determination whether a complete coupling loop *K*5 or *K*7 is provided in the respective column of the lines of holes S5 and S7, the indications L and 0 of the upper row of the respective code lines *s*5 and *s*7 are valid.

Figure 6:
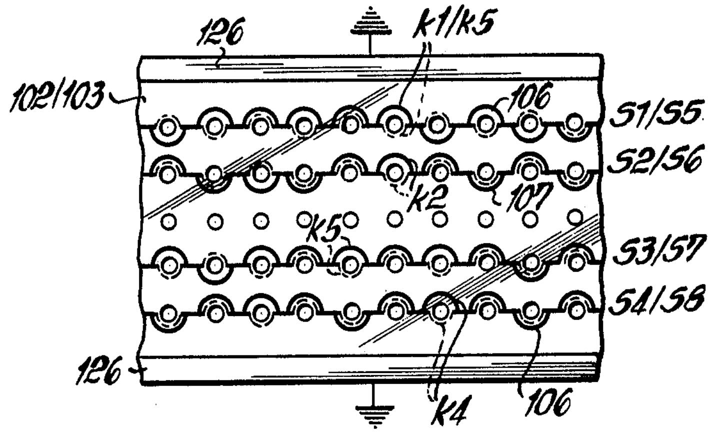
FIG. 6 is a schematic plan view illustrating a portion of a secondary plate with conductor bars having semicircular coupling loop portions attached to the secondary plate as a printed circuit component.

For shielding the line loops 109—117 from outside influences, the longitudinal edges of plates 101, 102, 103 are provided with shielding rails 126 which are connected to ground, see FIG. 6.

The code table of FIG. 1*a* represents the binary code for the keyboard of FIG. 1, and the code table of FIG. 2*a* represents a possible code for the keyboard of FIG. 2.

As is apparent from FIGS. 1 and 1*a*, keys 1, 4, 8, 12, 16, 20, 24, 28, 32, 36, 40, 44, 45 and 46 have two symbols, for example, key 1 has indicia representing the digit 1 and the total sign. Since each key 1—46, irrespective of whether it provided with one or two symbols, is associated with four coupling pins 93, 94, 95 and 96 and eight L-positions or 0-positions, respectively, corresponding to the code lines *s*1—*s*8, a shift key 51, similar to the shift key of a standard typewriter keyboard, is provided for distinguishing between the first and second symbols of those keys which have two symbols. Furthermore, for specifically identifying the two symbol keys in the code table of FIG. 1*a*, code line *s*8 is provided which represents the line loop 116 of the line of holes S8 of the secondary plate 103. All two-symbol keys have in line loop 116 one L-position, namely a coupling loop k8.

It will now be explained with reference to the diagram of FIG. 9, how the first and second symbols of a two-symbol key are distinguished. Photocell 125 is connected over a preamplifier 127, a pulse-shaping device, and an amplifier 129 with the input terminals E of the primary line loop 117 so that a light pulse produced by shutter 122 is supplied to the primary line loop 117 as a driving pulse. The primary line loop includes, in addition to the coupling loops *p*1, a primary winding 130 correlated with the shift key 51, and a primary winding 131 correlated with a command key 52. When key 51 or key 52 is actuated, the driving pulse in the primary loop 117 produces a secondary pulse in the secondary winding 130′ or in the secondary winding 131′, respectively. FIG. 1*a*shows in the row U and in the column of key 51, the additional L representing a shifting pulse, and row B of FIG. 1*a* shows in column 52 of the command key, an additional L representing the command pulse.

The secondary line loops 109—116 have additional compensating windings 109′—116′ into which secondary pulses are induced by the driving pulse of the primary loop 117. The transmission ratio between the primary loop 117 and the compensating winding 109′—116′ is adjustable, and selected so that, without a magnetic core and with the field passing only through air, the coupling between the primary loop 117 and the secondary loops 109—116 is reduced to zero. In other words, no secondary pulse is induced in the secondary line loops by a primary pulse without a magnetizable core in one of the coupling loops.

The secondary line loops 109—116 have terminals E1—E8 respectively connected with pulse amplifiers 132 from which induced pulses pass through pulse-shaping devices 133/1 to 133/8 into a buffer storage device 140 schematically indicated as a box, which includes flip-flops 136/1 to 136/6, 137, 138 and 139. Since the secondary coils 130′ and 131′ have several windings, and since a sufficiently great transforming ratio between the primary and secondary windings can be selected, the secondary coils 130′ and 131′ can be directly connected to the pulse-forming devices 134 and 135, respectively. Pulse-forming device 135 is connected with flip-flop 139 of buffer storage device 140.

Pulse-forming device 134 is connected by a NOR-element 141 and a NAND-element 142 on one hand with the flip-flop 138, and on the other hand with a further NAND-element 143 with a flip-flop 136/5. The second input of the NAND-element 142 is connected by a NOR-element 144 to the output of pulse-forming device 133/8, while the second input of the NAND-element 143 is connected by a NOR-element 145 with a pulse-forming device 133/5. While the outputs of the flip-flops 136/1 to 136/6, and 139 are directly connected with the output terminals A1-A6, and A8, the outputs of the flip-flops 137 and 138 are connected by half adder 146 with the output terminal A7.

A line 147 connects all pulse-forming devices 133/1 to 133/8, 134 and 135 with a terminal 147 which is connected by a line 149 with flip-flop 138 of storage device 140.

A pulse transmitted to terminal 147 serves the purpose of opening pulse-forming devices 133/1 to 133/8, 134 and 135, and signals at AB over flip-flop 138, the readiness of a connected data processing machine.

In order to carry out a parity control upon the input of values or commands, the secondary line loop 115, and the respective code line *s*7 of code table 1*a*, are provided for the parity bit in the flip-flop 137 of storage device 140, and available at terminal A7.

Due to the use of certain keys for two symbols, it is necessary to operate shift key 51 upon input of the second symbol in order to negate the bit entering the storage device 140. In order to obtain a correct result of the parity control, the parity bit at the terminal E7, has to be negated. Preferred is the negating of the bit in a line loop in which all two-symbol keys have the same bit L or 0.

OPERATION

If a key 53 is depressed by the operator, key lever 57 is guided by the parallelogram linkage 65, 66, 57'' to move to a position in which key lever 57 is parallel to its previous position. Return lever 66 is turned in clockwise direction as viewed in FIGS. 3 and 4, and its arm 68 tensions spring 70. At the same time, connecting lever 65 turns about shaft 71 so that coupling portion 65' moves from the position of FIG. 3 to the position of FIG. 4, remaining under hook 86' of coupling pawl 85. As shown in FIG. 3, the coupling portion 65' is located under hook 86' at the beginning of the movement so that coupling pawl 85 is raised whereby control lever 78, on which coupling pawl 85 is mounted by means of pivot 84, turns about the axis of shaft 77.

FIG. 4 shows that during the lifting motion of control lever 78, locking arm 80 enters the locking device 118 so that no other key can be actuated. The coupling arm 86 with hook 86' moves along a circular path having the center in the axis of shaft 77, while control lever 78 moves upward. Since connecting lever 65 has a different axis of rotation than control lever 78 with coupling pawl 85, coupling hook 86' slides off coupling portion 65' before the key has arrived in its lowest position in which key lever portion 57' abuts stop 63. As soon as hook 86' releases coupling portion 65', control lever 78 drops back to its initial position together with the pin carrier 92 which was moved upward from the position of FIG. 3 to the position of FIG. 4 by control lever 78 due to the lifting action produced by depression of the key.

During the upward movement of control lever 78 and of pin carrier 92, coupling pins 93, 94, 95 and 96, and also guide pin 97 of the respective pin carrier 92, enter registering holes in plates 98 and 101—105. At the same time, switch arm 82 of control lever 78 turns rail 119 about the axis of shaft 71 so that the shutter 122 breaks the light barrier 123 blocking the entry of light into photocell 124. When the coupling between coupling portion 65' and coupling hook 85' of coupling pawl 85 is interrupted, and pin carrier 92 on lifting arm 79 of control lever 78 drops to its initial position on stop rail 83, switch arm 82 releases rail 119, and spring 121 turns shutter 122 back to its initial position permitting light from a lamp 125 to enter photocell 124. At the same time, locking lever 80 moves out of the locking device 118 so that another key can be operated, before the first-actuated key 53 has returned to its higher normal position.

Upon release of the key, spring 70, acting on lever 66 returns the key to its normal position. Coupling pawl 85 is mounted for turning movement on control lever 78 and biassed by a spring 89 so that coupling hook 86' of coupling arm 86 can slide past coupling portion 65' of connecting lever 65, and coupling portion 65' can again assume its position under hook 86' during the return movement of key 53. Arm 87 of control lever 78 abuts shaft 77 during the upward movement of control lever 78 and opposes the action of spring 89 which tends to hold hook 86' above the coupling portion 65'.

Coupling pawl 85 and connecting lever 65 with coupling portion 65' together form a self-releasing coupling since it permits control levers 78 and pin carriers 92 to return to the initial position before the operator has released the depressed key. The self-releasing feature of the coupling serves to substantially increase the writing speed.

When shutter 122 blocks the rays of lamp 125, a light-dark impulse is produced in photocell 124 at the moment in which the magnetizable coupling pins 93, 94, 95, 96 have completely entered the holes of the primary and secondary plates 101, 102, and 103 in the position of FIG. 4 upon raising of the respective pin carrier 92. The light-dark impulse in photocell 125 is amplified by amplifiers 127 and 129 and shaped by the pulse-shaping device 128 to form a driving pulse in the primary loop 117. Due to the previous adjustment of the compensating windings 109'—116', a secondary pulse is induced only in those secondary line loops 109—116 in which the operative coupling pins find a complete coupling loop forming the secondary winding for the primary winding of the coupling loop $p1$ in the primary line loop 117. Coupling pins which enter holes in the secondary plates 102 and 103 in which the upper and lower semicircular conductor portions of conductor bars 106, 107 are superimposed in parallel positions, cannot produce a secondary pulse in the secondary line loops.

Assuming that key 3 associated with the character A, see FIG. 1, is operated in accordance with the code shown in the table of FIG. 1*a*, secondary pulses are produced in secondary line loops 109 (S1) and 114 (S6). Secondary line loops 109 and 114 have now pulses representing the bit L, while all other secondary line loops supply the bit 0 to the storage device 140. Assuming that key 13 with character C is depressed, secondary line loops 109 (S1), 109 (S2), 114 (S6) and 115 (S7) will have the L-bit.

All two-symbol keys 1, 4, 8, 12, 16, 20, 24, 28, 32, 36, 40, 44, 45, 46 have in the secondary line loop 113 (S5) a coupling loop $K5$ as is indicated in line $s5$ of the code table of FIG. 1*a*. Thus, whenever a two-symbol key is actuated, the secondary line loop 113 (S5) has a L-bit which is supplied by the NOR-element 145 to the NAND-element 143 after transformation into a 0-bit. When a two-symbol key is operated, the secondary line loop 116 (S8) also has a L-bit which is transformed by the NOR-element 144 into a O-bit, and supplied as such to the NAND-element 142.

If the digit 1 of key 1 is to be entered, key 1 is operated without actuation of the shift key 51, and each secondary line loop 109 (S1), 113 (S5) and 116 (S8) have the L-bit. While the L-bit of secondary line loop 109 (S1) enters storage device 140 without any change, the L-bit of the secondary line loop 113 (S5) is transformed by the NOR-element into a 0-bit and again transformed by the NAND-element 143 into a L-bit which is available at the output terminal A5.

The L-bit of the secondary line loop 116 (S8) which after passing the NOR-element 144 arrives as a O-bit at the NAND-element 142 cannot transform by the same into a L-bit, because the necessary 0-bit is not produced at the NAND-element 142 by operation of shift key 51. When shift key 51 is not depressed, the 0-bit from impulse-shaping device 134 is transformed by the NOR-element 141 into a L-bit and supplied to the NAND-element 142.

For example, if the symbol %, which is the second symbol of key 16 is to be entered into the storage device 140, the operator must simultaneously actuate key 16 and shift key 51, similar to the selection of an upper case character in a standard typewriter. The operation of key 16 produces a L-bit in each of the secondary line loops 109 (S1), 111 (S3), 113 (S5), 115 (S7), and 116 (S8). While the L-bits of the secondary line loops 109 and 111 arrive without any change in the flip-flops 136/1 and 136/3 of storage device 140, the L-bits of the secondary line loops 113 and 115 are each transformed into a 0-bit in the following manner:

Upon actuation of shift key 51, a L-bit is produced in the secondary winding 130', shaped by pulse-shaping device 134 and transformed by NOR-element 141 into a 0-bit which, together with the 0-bit of NOR-element 144 of secondary line loop 116, produces a L-bit at the output of the NAND-element 142. This L-bit is on one hand supplied to the NAND-element 143 and on the other hand to the flip-flop 138. In the NAND-element 143, this L-Bit has the effect that the 0-bit of NOR-element 145 arrives without change at the flip-flop 136/5 and at the terminal A5 of the storage device 140.

At the same time, the half adder 146, which follows flip-flops 137, 138, has the effect that the two L-bits, one of which arrived from the secondary line loop 115 through the pulse-forming device 133/7 in the flip-flop 137, while the other of which arrived from the NAND-element 142 at the flip-flop 138, are together transformed into a 0-bit available at the output terminal A7.

Due to the fact that simultaneously with the negation of the bits between pulse-shaping device 133/5 and flip-flop 136/5, also the L-bit of the secondary line loop 115 arriving through pulse-forming device 133/7 at the flip-flop 137 was negated, and is available as 0-bit at the output terminal A7 of the storage device 140, the parity is also corrected.

After each entry, or before each entry of an information-representing pulse, the storage device 140 is cleared by clearing pulse arriving through line 152. As explained with reference to the above example, the apparatus, using 46 alphanumerical keys and one shift key 51, is capable of entering more information in the form of code sequences than there are keys.

The code represented in the table of FIG. 1*a* permits the above-described apparatus to enter $2^6$ or 64 information-representing signals.

If the command key 52 is also considered, the capacity of the apparatus is increased by another power of 2. When the command key is actuated, the information entered by operation of a key 1—46 is not just stored, but constitutes a command which is programmed into the data processing machine and is supplied to the same from storage device 140 for immediate execution.

Independently of the command key 52, it is preferred that the commands of keys 47, 48, 49 and 50 are also contained in capacity of the code represented by the table of FIG. 1*a* and are associated with corresponding coupling loops of the secondary line loops 109—116 (S1-S8).

Figure 9:
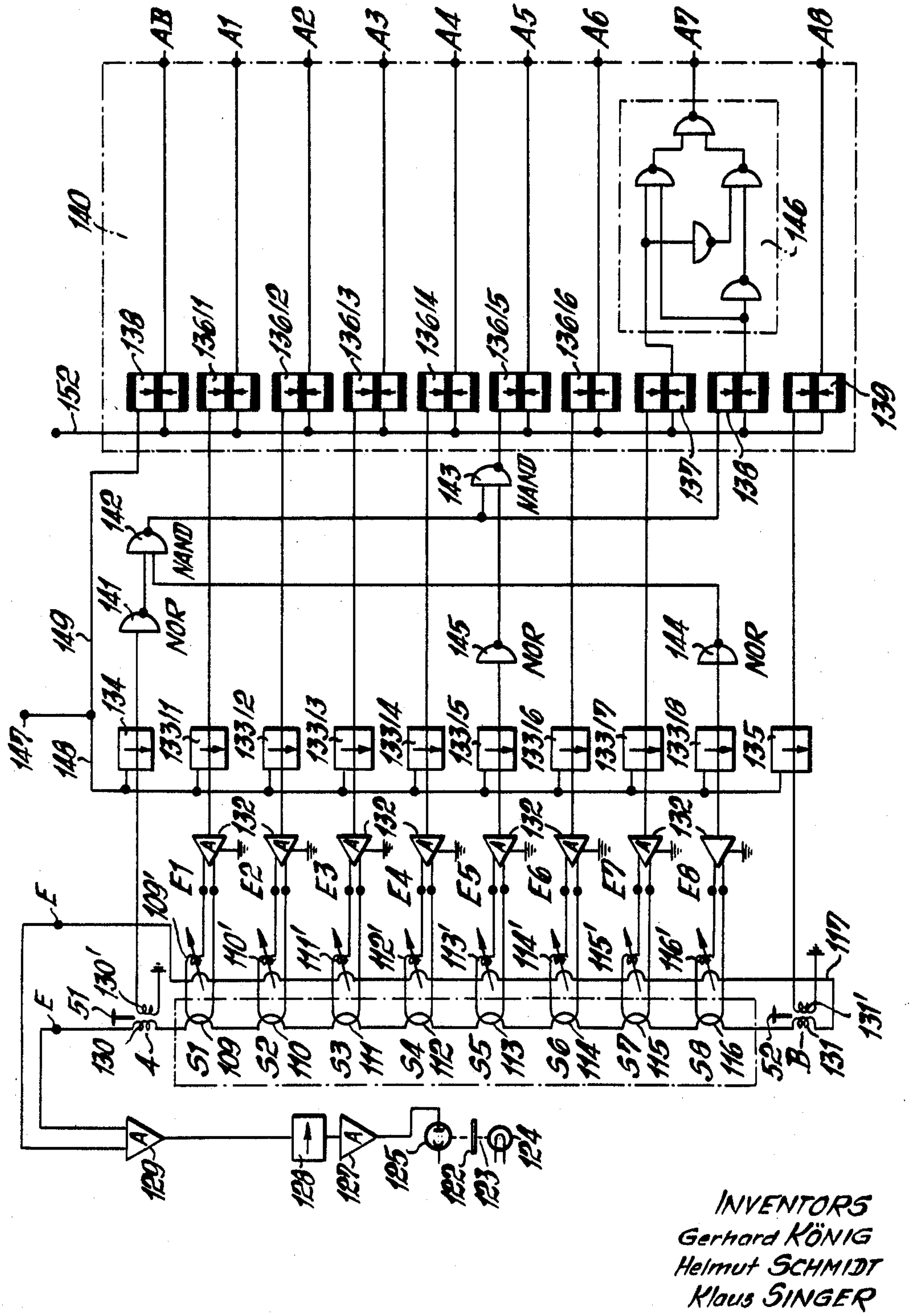
FIG. 9 is a circuit diagram illustrating the electronic circuit of the input arrangement of the invention.

If the apparatus of the invention is used for a strictly numerical keyboard with several function keys, as shown in FIG. 2, the circuit illustrated in FIG. 9 is simplified, since the shift key 51 with primary and secondary windings 130 and 130′, and the command key 52 with primary and secondary windings 131 and 131′, as well as the secondary line loop 116 (S8) can be omitted. Accordingly, pulse-shaping devices 134, 135, NOR-elements 141, 144, 145, and NAND-elements 142 and 143 can be omitted. The storage device 140 can be simplified by omission of the flip-flops 137, 138, 139 and of the half adder 146.

Although the keyboard illustrated in FIG. 2 has only 32 keys, the respective secondary plates 102 and 103 have seven secondary line loops whose coupling loops are arranged in accordance with the seven lines *sn*1—*sn*7 of the code table of FIG. 2*a*. This is not required by the invention according to which a smaller number of secondary line loops would be sufficient, but is due to the application of the invention for data processing apparatus based on the NOR-circuitry so that a coding with two spare bits results in a comparatively simple decoding matrix. Furthermore, the arrangement permits additions of keys to the keyboard.

Generally speaking, the input arrangement of the invention comprises primary circuit means including a primary line loop 117, two sets of secondary circuit means including first secondary line loops 110, 112, 114, 116 and second secondary line loops 109, 111, 113, 115, the primary line loop 117 being provided with coupling loops p1 for each hole in the primary plate 101, and the secondary line loops being provided with coupling loops surrounding holes in the secondary plates 102 and 103 only where required by the code of FIG. 1*a*, a plurality of sets of core pins 93—96 operated by the keys 1—52 to move to and from a coupling position located in a set of four primary coupling loops and in corresponding secondary coupling loops where the same are provided, means 122, 125, 127, 128, 129 for generating a driving pulse in the primary line loop 117 and being operated by each actuated key by means of rail 119 so that a driving pulse is generated in the primary circuit and produces a secondary pulse only in a secondary line loop connected by a secondary coupling loop and by a core pin in the coupling position with a primary coupling loop, and a set of output means A1—A8 respectively connected with the secondary line loops 109—116 of the secondary circuit means.

It will be understood that teach of the elements described above, or two or more together, may also find a useful application in other types of input arrangements for data processing machines differing from the types described above.

While the invention has been illustrated and described as embodied in an input arrangement controlled by keys actuating core pins to produce an inductive coupling between a primary circuit and a set of secondary circuits connected by coupling loops and actuated core pins to the primary circuit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Input arrangement for representing information in coded form; comprising, in combination, a primary plate, and at least one secondary plate superimposed on said primary plate, said primary and secondary plates having a plurality of sets of registering holes forming a plurality of rows of registering holes; primary circuit means carried by said primary plate and having a plurality of sets of primary coupling loops; at least one set of secondary circuit means carried by said secondary plate, each secondary circuit means having secondary coupling loops registering with selected primary coupling loops in accordance with a code; a plurality of key means; a plurality of sets of coupling core means, said sets of core means being respectively connected with and controlled by said key means to move to and from an operative position located in a set of said holes and primary coupling loops and in secondary coupling loops where the same are provided in accordance with said code; means for generating a driving pulse in said primary circuit means and being operated by said key means so that upon actuation of any selected key means, a driving pulse is produced in said primary circuit means and produces a secondary pulse only in a secondary circuit means connected by a secondary coupling loop and by a core means in said operative position with a primary coupling loop; and a set of output means respectively electrically connected with said secondary circuit means for receiving said secondary pulses.

2. Input arrangement for representing information in coded form; comprising, in combination, primary circuit means having a plurality of sets of primary coupling loops, said primary circuit means including a set of pairs of primary conductor bars extending along a set of imaginary lines and being connected to form a primary line loop having portions extending along said lines, said primary conductor bars of each pair having portions forming said primary coupling loops; at least one set of secondary circuit means, each having secondary coupling loops registering with selected primary coupling loops in accordance with a code, said secondary circuit means including at least one set of pairs of secondary conductor bars extending along said lines, respectively, the ends of said secondary conductor bars of each pair being connected to each other so as to form a set of secondary line loops, said secondary conductor bars of each pair having portions forming said secondary coupling loops; a plurality of key means; a plurality of sets of coupling core means, said sets of core means being respectively connected with and controlled by said key means to move to and from an operative position located in a set of said primary coupling loops and in secondary coupling loops where the same are provided in accordance with said code; means for generating a driving pulse in said primary circuit means and being operated by said key means so that upon actuation of any selected key means, a driving pulse is produced in said primary circuit means and produces a secondary pulse only in a secondary circuit means connected by a secondary coupling loop and by a core means in said operative position with a primary coupling loop; and a set of output means respectively electrically connected with said secondary circuit means for receiving said secondary pulses.

3. Input arrangement for representing information in coded form; comprising, in combination, primary circuit means having a plurality of sets of primary coupling loops; at least one set of secondary circuit means each having secondary coupling loops registering with selected primary coupling loops in accordance with a code; a plurality of key means; a plurality of sets of coupling core means, said sets of core means being respectively connected with and controlled by said key means to move to and from an operative position located in a set of said primary coupling loops and in secondary coupling loops where the same are provided in accordance with said code; a plurality of linkages respectively connecting said key means with said sets of core means, each linkage including a self-disengaging coupling means so that each set of core means is disconnected from the respective key means after having been moved by the same by means of said linkage to said operative position; means for returning each set of core means to a position of rest upon disengagement of the respective coupling means; means for generating a driving pulse in said primary circuit means and being operated by said key means so that upon actuation of any selected key means, a driving pulse is produced in said primary circuit means and produces a secondary pulse only in a secondary circuit means connected by a secondary coupling loop and by a core means in said operative position with a primary coupling loop; and a set of output means respectively electrically connected with said secondary circuit means for receiving said secondary pulses.

4. Input arrangement for representing information in coded form; comprising, in combination, primary circuit means including a primary winding having a plurality of sets of primary coupling loops; at least one set of secondary circuit means, each including a secondary winding having secondary coupling loops registering with selected primary coupling loops in accordance with a code; a plurality of key means forming a keyboard, and including alphanumerical key means for effecting printing of a selected one of two different alphanumerical symbols, and a shift key; a plurality of sets of coupling core means, said sets of core means being respectively connected with and controlled by said alphanumerical key means to move to and from an operative position located in a set of said primary coupling loops and in secondary coupling loops where the same are provided in accordance with said code; means for generating a driving pulse in said primary circuit means and being operated by said key means so that upon actuation of any selected key means, a driving pulse is produced in said primary circuit means and produces a secondary pulse only in a secondary circuit means connected by a secondary coupling loop and by a core means in said operative position with a primary coupling loop; a set of output means respectively electrically connected with said secondary circuit means for receiving said secondary pulses; and a coupling core operated by said shift key to magnetically couple said primary and secondary windings whereby a shift pulse is produced in said secondary circuit means by a driving pulse in said primary circuit means; said secondary circuit means including means for producing an L bit representing one of said alphanumerical symbols of an actuated alphanumerical key means at said output means under the control of said secondary pulse; and negating means for producing an O bit representing the other alphanumerical symbol of said actuated key means when said shift key is operated at the same time as said alphanumerical key means whereby a selected one of said two alphanumerical symbols can be represented at said output means.

5. Input arrangement as claimed in claim 1 wherein each said key means has the same number of ferromagnetic coupling core means in each set of coupling core means; wherein said primary coupling loops of each set have said number; wherein said secondary coupling loops of each set have said number; and wherein primary and said secondary coupling loops which register with each other substantially surround in accordance with said code registering holes in said primary and secondary plates, and the core means in the same in said operative position.

6. Input arrangement as claimed in claim 2 wherein said portions of said secondary conductor bars are semicircular; wherein corresponding semicircular portions of a pair of secondary conductor bars have one position in which they are parallel, and another position in which they complement each other to form a substantially circular secondary coupling loop; the parallel position representing O, and said secondary coupling loop representing L in a binary code.

7. Input arrangement as claimed in claim 1 wherein said primary circuit includes a set of pairs of primary conductor bars respectively extending along said rows of holes in said primary plate, said primary conductor bars of each pair forming said primary coupling loops about said holes in said primary plate, said primary conductor bars being connected to form a primary line loop having portions extending along said rows of holes of said primary plate.

8. Input arrangement as claimed in claim 7 wherein said secondary circuit means include at least one set of pairs of secondary conductor bars extending along said rows of holes in said secondary plate, the ends of said secondary conductor bars of each pair being connected to each other to form a set of secondary line loops, said secondary conductor bars of each pair having portions together forming said secondary coupling loops about selected holes in said secondary plate.

9. Input arrangement as claimed in claim 1 wherein said primary circuit includes a set of pairs of primary conductor bars respectively extending along said rows of holes in said primary plate, said primary conductor bars of each pair forming said primary coupling loops about said holes in said primary plate, said primary conductor bars being connected to form a primary line loop having portions extending along said rows of holes of said primary plate; and wherein said secondary circuit means include at least one set of pairs of secondary conductor bars extending along said lines of holes in said secondary plate, the ends of said secondary conductor bars of each pair being connected to each other to form a set of secondary line loops, said secondary conductor bars of each pair having portions together forming said secondary coupling loops about selected holes in said secondary plate.

10. Input arrangement as claimed in claim 9 wherein conductor bars of a pair of conductor bars are secured along the length thereof to opposite surfaces of the respective plate, respectively, to form with the respective plate a printed circuit.

11. Input arrangement as claimed in claim 9 wherein each set of holes forms a column in said set of rows of holes; and comprising a plurality of movable carriers; wherein each set of core means is a set of magnetizable coupling pins mounted on a carrier opposite a column of registering holes in said plates; and comprising linkage means connecting each carrier with one of said keys so that each carrier with the respective set of coupling pins is moved by the respective key to said operative position in which said coupling pins are located in registering holes of a column and in the respective coupling loops.

12. Input arrangement as claimed in claim 1 comprising a first and second secondary plates superimposed on said primary plate, said primary and secondary plates having a plurality of sets of registering holes forming a set of rows; wherein said primary circuit means include a set of pairs of primary conductor bars, said pairs extending along said rows of holes, respectively, of said primary plate and forming said primary coupling loops about said holes in said primary plate, and being connected to form a primary line loop having portions along said rows; wherein said secondary circuit means include two sets of pairs of secondary conductor bars, said pairs of secondary conductor bars extending along said rows of holes in said first and second secondary include two plates, respectively, and forming secondary loops about selected holes in said first and second secondary plates, the ends of each pair of secondary conductor bars being connected to each other so that the conductor bars of said first secondary plate form a first set of secondary line loops having first secondary coupling loops, and the conductor bars of said second secondary plate form a second set of secondary line loops having second secondary coupling loops; and wherein said secondary line loops are respectively connected with different output means.

13. Input arrangement as claimed in claim 3 wherein each linkage includes a locking arm; and comprising locking means engaged by said locking arm in said operative position of each set of core means so that only one key means can be operated and only one set of core means can be moved to said operative position at a time.

14. Input arrangement as claimed in claim 3 comprising a base plate including a plurality of base plate portions and consisting of a synthetic material, said primary and secondary plates being superimposed on said base plate; and metal frame means for said superimposed plates, said base plate portions being individually secured to and supported by said metal frame means.

15. Input arrangement as claimed in claim 4 wherein said set of secondary circuit means includes a special secondary circuit means having coupling loops arranged so that a secondary pulse is produced in said special secondary circuit means upon actuation of any of said alphanumerical key means wherein said negating means is electrically connected with said special circuit means; and wherein all said alphanumerical key means are associated with corresponding bits for representing upper case and lower case symbols.

16. Input arrangement as claimed in claim 15 wherein said set of secondary circuit means includes a first group of secondary circuit means for producing a group of secondary pulses at a corresponding group of output means, and a second group of secondary circuit means electrically connected with said secondary winding for carrying out a parity control when said shift key is operated.